United States Patent [19]

Sahota

[11] Patent Number: 5,144,506
[45] Date of Patent: Sep. 1, 1992

[54] CASSETTE LOADER HAVING SIMULTANEOUS PUSHER AND GRIPPER MOVEMENT

[75] Inventor: Surinder Sahota, Mississauga, Canada

[73] Assignee: Strongfield International plc, London, England

[21] Appl. No.: 476,519

[22] Filed: Feb. 7, 1990

[51] Int. Cl.⁵ .............................................. G11B 15/68
[52] U.S. Cl. ....................................................... 360/92
[58] Field of Search ........................................... 360/92

[56] References Cited

U.S. PATENT DOCUMENTS

4,420,779 12/1983 Takano ................................... 360/92
4,807,066 2/1989 Imazaike ............................... 360/92

Primary Examiner—A. J. Heinz
Attorney, Agent, or Firm—Eugene J. A. Gierczak

[57] ABSTRACT

This invention relates to a cassette changer for loading and unloading cassettes from a recorder comprising: a magazine for holding a plurality of cassettes adjacent the recorder; a gripper for loading one cassette from said magazine into said recorder and for unloading said cassette from said recorder; a shaft; said gripper moounted for slidable movement along said shaft; a wire for moving said gripper; and an electrical motor associated with said wire for moving said gripper so as to sequentially load and unload said cassettes from said recorder.

20 Claims, 5 Drawing Sheets

CASSETTE LOADER HAVING SIMULTANEOUS PUSHER AND GRIPPER MOVEMENT

FIELD OF INVENTION

This invention relates to a cassette changer for loading and unloading cassettes from a recorder and particularly relates to a video cassette changer to sequentially load and unload video cassettes from a video recorder.

BACKGROUND TO THE INVENTION

Video cassette machines have become a common household item. Such video cassette machines, however, normally receive one video tape to be either viewed on a screen associated with said video recorder one at a time. Furthermore such video tape machines may be electrically connected to another video tape machine so as to copy the program from one tape in one machine to a blank tape in a second machine.

Various attempts have heretofore been made in order to automatically or sequentially load one cassette from a stack of cassettes into a video recorder.

For example, U.S. Pat. No. 3,582,082 teaches a tape cassette automatic exchange device for automatically supplying a number of magnetic tape cartridges stacked in a magazine to a pre-determined playing or recording position one after another for playing a recording in such a manner that the lower most tape cartridge is placed in said playing or recording position, removed from said position upon completion of the playing or recording and then the next tape cartridge is place in said position.

Moreover, U.S. Pat. No. 3,722,892 relates to a mechanism operable to sequentially place each of the plurality of cassettes into an effective position for recording or reproduction including inverting the cassette to position each of two magnetic tracks in the effective position.

Yet another device is disclosed in U.S. Pat. No. 4,860,133 which relates to a cart spot player having a tape library or bin structure, a series of tape transports in stacked alignment, and a cassette loading/unloading station as part of the bin structure at one side of the player. Input/Output ports are provided for the bin structure. Furthermore, at the opposite side of the player, input/output ports are provided for the bin structure.

Finally, U.S. Pat. No. 4,133,013 shows a plurality of vertically stacked cassette trays which are adapted to contain video cassettes and a support member adapted to maintain the vertically stacked cassette trays in the fixed position. The video cassette player-changer also includes a motor adapted so that it may be driven in two directions, a screw mechanically coupled to the motor so that it rotates in response to the motor, a coupling device which couples the rotating screw to the support member so that the rotating screw raises and lowers the support member. The video cassette player-changer further includes a housing adapted to contain the plurality of video cassette players, the plurality of vertically stacked trays and their support member, the motor, screw and also a cassette changing device for unloading or loading the video cassette players which is mechanically coupled to the cassette trays. A programming apparatus programs that video cassettes will be played in a particular video cassette player at a particular time by electrically controlling both the motor and the cassette changing device so that the particular video cassette may be placed in the particular video cassette player.

These and other prior art devices disclosed relatively complicated structures which have relatively limited utility.

It is an object of this invention to provide an improved cassette changer and particularly provide an improved video cassette changer for loading and unloading video cassettes from a video machine.

The broadest aspect of this invention relates to a cassette changer for loading and unloading cassettes from a recorder comprising: a holding device for holding a plurality of cassettes adjacent said recorder; displaceable structure for loading one cassette from said holding device into said recorder in a first position and for unloading said cassette from said recorder to a second position; a shaft; said displaceable structure mounted for slidable movement along said shaft between said first and second positions; a flexible wire for moving said displaceable structure between said first and second position; an electrical motor associated with said flexible wire for moving said displaceable structure between said first and second positions so as to sequentially load and unload said cassettes into and from said recorder respectively.

A further aspect of this invention relates to a video cassette changer for loading and unloading video cassettes from a video cassette machine comprising; a magazine adapted to be disposed on top of said machine, said magazine including, an opening at the top thereof for receiving said cassettes for stacking therein, a tray disposed at the bottom thereof, and a side opening; a gripper for advancing said cassette in said tray into said recorder in a loaded position, and for unloading said cassette from said recorder in said unloaded position; a pusher receivable by said side opening for pushing the bottom cassette in said magazine means into said tray in said unloaded position and retractable from said side opening to permit said stack of cassettes to fall within said magazine in said loaded position; a shaft; said pusher and said gripper mounted for slidable movement along said shaft between said loaded and unloaded position; a wire for moving said pusher and said gripper; pulleys for receiving said wire; an electrical motor associated with said pulley for activating said wire to move said pusher and said gripper to sequentially load and unload said cassettes into and from said machine respectively.

A still further aspect of this invention relates to a video cassette changer for loading and unloading video cassettes from a video cassette machine comprising; a magazine adapted to be disposed in front of said machine, said magazine including, an opening at the top thereof for receiving said cassettes for stacking therein and a lip disposed at the bottom thereof for retaining said cassette in said stacked position in said magazine; a gripper including a stationary arm and a displaceable arm; a solenoid associated with said displaceable arm so as to, advance the bottom cassette into said magazine by said displaceable arm into said machine in a loaded position while said stationary arm prevents said stack of cassettes from falling to said lip in said loaded positions, and grip said cassette from said recorder between said stationary and displaceable arm to withdraw said cassette from said machine to an unloaded position where said stationary arm clears said stack of cassettes in said magazine and where said stack of cassettes drops to said lip; a shaft; said gripper mounted for slidable movement along said shaft between said loaded and unloaded positions; a wire for moving said gripper between said loaded and unloaded positions; pulleys for receiving said wire; an electrical motor associated with said pulley for activating said wire to move said gripper to sequentially load and unload said cassettes into and from said machine respectively.

These and other objects and features of the invention shall now be described in relation to the attached drawings.

DESCRIPTION OF THE INVENTION

Like parts have been given like numbers throughout the figures.

Figure 1:
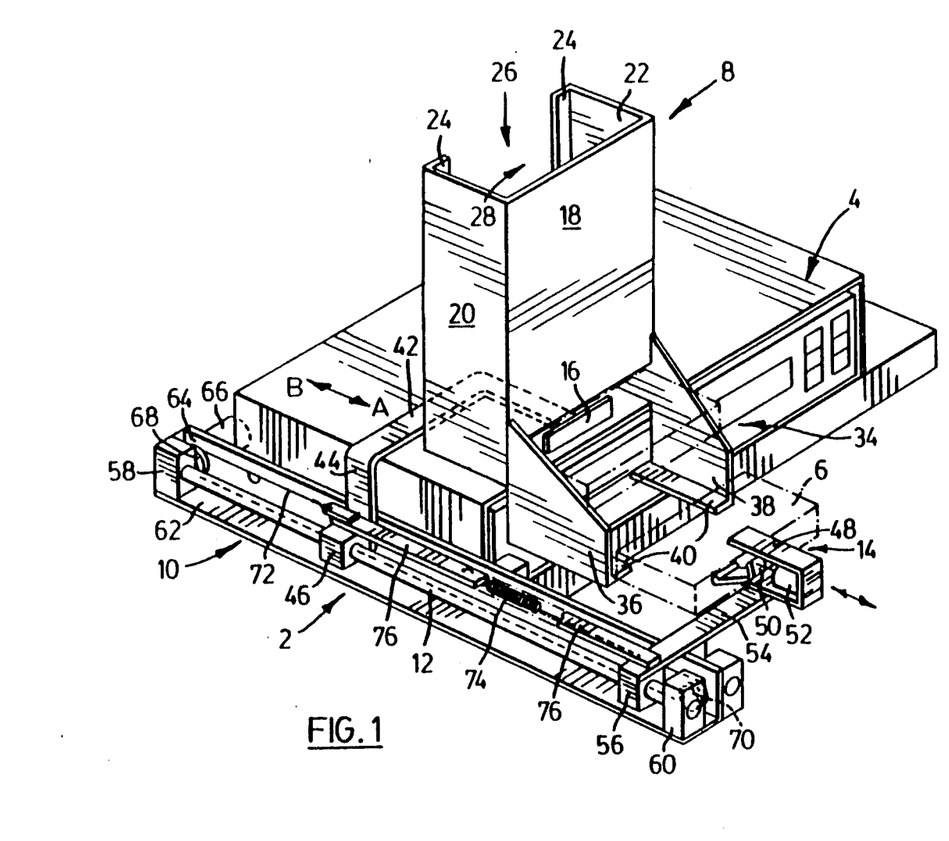
FIG. 1 is a prospective view of the first embodiment of the invention which includes a pusher.

FIG. 1 shows the cassette changer 2 which as shown in FIG. 1 relates to a video cassette changer 2 which is used in association with a video machine or recorder 4. The video machine 4 is a standard front load video cassette machine which may be electrically connected to a screen such as a television (not shown) by electrical connection which is well known to those persons skilled in the art.

It should be noted that the video cassette changer 2 as described herein may be used in association with a video cassette machine so as to sequentially load and unload video cassettes into the video machine 4 so as to view different programs on separate cassettes on a television or the like (not shown) In such case an electrical programmable device (not shown) is utilized to sequentially load and unload the video cassettes 6 from the video machine at a pre-selected time.

Moreover, the cassette changer 2 may be used on one video machine 4 as shown in FIG. 1, which video machine 4 is connected in series with a second video machine (not shown) in which arrangement the second video machine (not shown) would contain a program on a master video cassette which is to be copied onto each of the video cassettes 6 to be sequentially loaded and unloaded into the video machine 4 in a manner to be more fully described herein. Again an electrical programmable device would be utilized in order to load and unload the cassettes 6 into the machine 4 when copying the program on the master cassette on to each of the video cassette 6.

The video cassette changer 2 includes a holding means or magazine 8, frame 10, shaft 12, gripper 14 and pusher 16. Although the holding means or magazine 8 described in FIG. 1 relates to a vertical structure or stacking means 8, a horizontal magazine 8 could also be used where the cassettes 8 are disposed in horizontal side by side relationship and advanced one at a time as described herein. A horizontal magazine 8 could be used where little vertical space is available as in the case where the device herein is to be located between shelves or the like.

More particularly, the magazine 8 is box-like in structure and includes front wall 18, ends 20 and 22, and a side wall 24, having a side wall opening 26. The side opening 26 is adapted to receive the pusher 16 as best illustrated in FIGS. 2 and 3.

Figure 2:
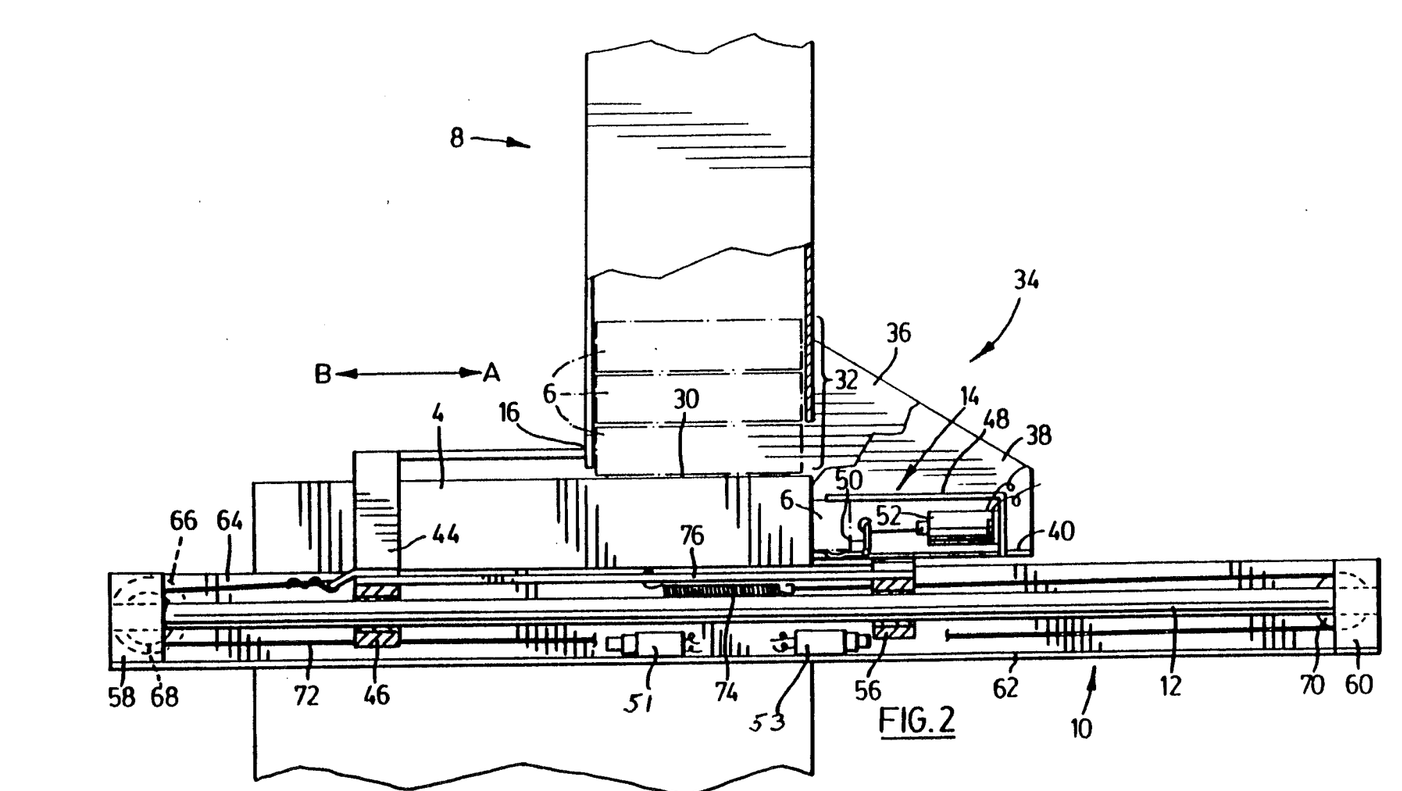
FIG. 2 is a side elevational view of the first embodiment of the invention wherein the gripper is unloading a cassette from the recorder.
Figure 3:
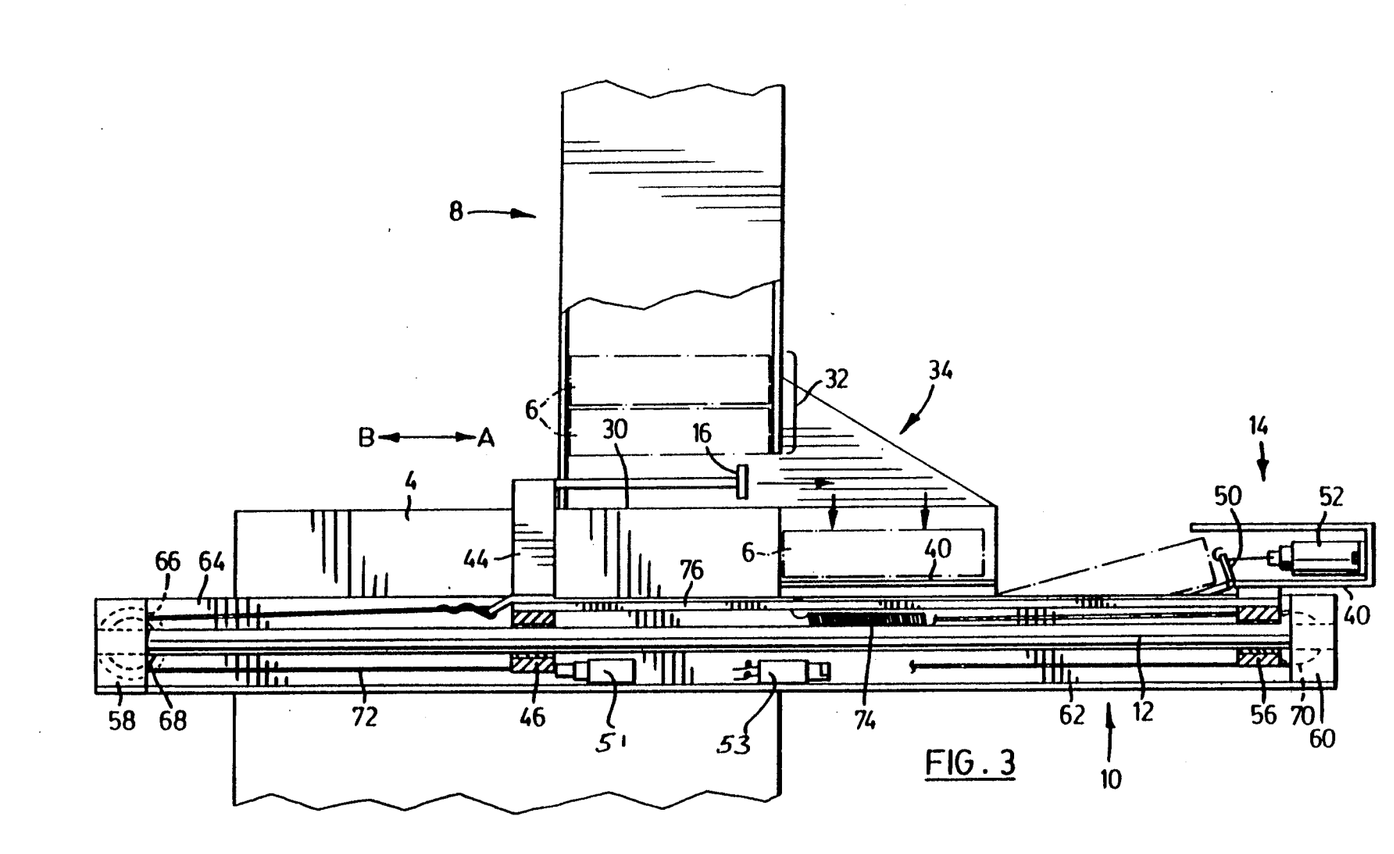
FIG. 3 is a side elevational view of the first embodiment of the invention.

The magazine 8 also includes an opening 28 at the top thereof which is adapted to receive a plurality of cassettes 6 to be vertically stacked therein as best illustrated in FIG. 2.

It will be noted that the magazine 8 is adapted to rest on top of the video machine 4 and the magazine 8 has an opening 30 at the bottom thereof as seen in FIG. 2 so that the stack 32 of cassettes 6 rests on the top of the video machine 4.

The magazine 8 also includes a forwardly projecting tray means 34. The tray 34 includes a pair of spaced walls 36 and 38, which are either integral with end walls 20 and 22 or connected thereto.

The spaced walls 36 and 38 of tray 34, include a horizontally projecting lip 40 which is adapted to guide each cassette 6 into the video machine 4 in a manner to be more fully particularized herein.

Pusher 16, is slideably mounted onto shaft 12 as best seen in FIG. 1. More particularly, pusher 16 includes an L-shaped portion 42 integral with a vertical portion of 44. The vertical portion of 44 is connected to a bushing member 46, which is adapted to reciprocate along a shaft 12 between a first loading position and a second loading position which shall be more fully described herein.

Moreover, a gripper 14 includes a stationary arm 48 and a displaceable arm 50 which is connected to a solenoid 52. The solenoid is activated by appropriate signal means (not shown) which activates the displaceable arm 50 between a gripped position where a cassette 6 is gripped between the stationary arm 48 and displaceable arm 50 as best shown in FIG. 2. Furthermore, the solenoid 52 deactivates the displaceable arm 50, so as to unload the cassette 6 as best seen in FIG. 3.

Figure 4:
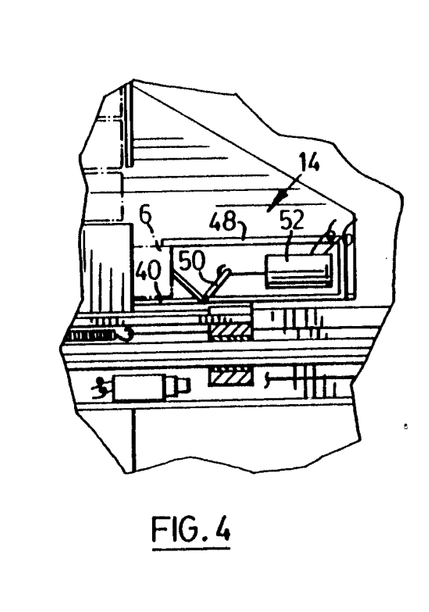
FIG. 4 is a partial side elevational view of the first embodiment of the invention in the loading position.

Finally, the solenoid 52 also activates displaceable arm 50 in a manner so that gripper 14 pushes cassette 6 into the recorder 4 as best shown in FIG. 4.

Horizontal connecting member 54 is connected at one end thereof to gripper 14 and at the other end thereof to a bushing member 56 which is adapted to reciprocate along shaft 12 between a loaded and unloaded position which shall be more fully described herein. Frame 10 includes stationary end members 58 and 60 which retain shaft there between. The frame 10 presents an L-shaped cross-section having a bottom leg 62 and an upstanding side wall 64.

Stationary end members 58 and 60 are connected to bottom leg 62. Motor 66 is connected to first pulley 68 as best seen in FIG. 1. Furthermore, pulley 70 is located at the other end of frame 10. Pulleys 68 and 70 are adapted to receive flexible means or wire 72 which is adapted to be moved by pulleys 68 and 70 when pulley 68 is activated by electrical motor 66. The electrical motor 66 is energized by the appropriate signal from the electrical programming means (not shown) in a manner well known to those persons skilled in the art.

A tensioning spring 74 is included so as to maintain the proper tensioning in wire 72. The operation of the cassette changer 2 as shown in the first embodiments shall now be described.

When the video cassette 6 has reached its end position in machine 4, an appropriate electrical signal activates machine 4 so as to eject cassette 6 in a manner well known to those person skilled in the art. When the cassette 6 is ejected from machine 4, the electrical programming means (not shown) activates motor 66 so as to cause the gripper 14 to approach cassette 6 while another electrical signal from the programming means (not shown) activates solenoid 52 which moves displaceable arm 50 in a manner so that the gripper 14 grips cassette 6 between the stationary arm 48 and displaceable arm 50 as best seen in FIG. 2.

Thereafter, another electrical signal activates motor 66 so as to cause the pulley 68 to move wire 72 in the direction of arrow A so as to unload cassette 6 in an unloaded position as best seen in FIG. 3. In the unloaded position as shown in FIG. 3, solenoid 52 is energized so as to move displaceable arm 50 and cause the spent cassette 6 to fall in a receiving bin (not shown).

It will be noticed that the horizontal member 54 connected to gripper 14 is also connected to the wire 72 by connecting member 76 and that the pusher 16 is also connected to bushing member 46 and wire 72 by means of connecting member 76.

Accordingly, as the gripper 14 is displaced by wire 72 to the unloaded position as shown in FIG. 3 pusher 16 moves from a first position as shown in FIG. 2 to a second or unloaded position as shown in FIG. 3 whereby the pusher 16 bears against the bottom cassette 6 in stack 32 so as to push the bottom cassette 6 in the direction of arrow A such that the bottom cassette 6 falls into tray 34 and particularly falls onto lips 40 of tray 34 as best illustrated in FIG. 3.

Thereafter, solenoid 52 is activated by the electrical programmable means (not shown) so as to cause the displaceable arm 50 to be moved into the position shown in FIG. 4. Thereafter, the electrical programmable means (not shown) activates electrical motor 66 so as to cause the pusher 14 to be displaced in the direction of arrow B so as to advance the bottom cassette 6 in tray 34 into recorder 4 in the loaded position as best illustrated in FIG. 2. As gripper 14 is displaced from the unloaded position to the loaded position shown in FIG. 2 pusher 16 is simultaneously displaced from the position shown in FIG. 3 which is the unloaded position to the position shown in FIG. 2.

It can be seen from FIGS. 2 and 3 that limit switches 51 and 53 are utilized such that bushing member 46 contacts limit switch 51 in the unloading position so as to send the appropriate signal to the programmable means (not shown) to initiate the loading sequence. Furthermore bushing member 56 contacts limit switch 53 in the loaded position.

Once the cassette 6 in recorder 4 is ejected the sequence referred to above is repeated so that the cassette changer 4 as shown in the first embodiment sequentially loads and unloads cassettes into and out of the recorder 4 as described above. The gripper 14 and pusher 16 reciprocates between a loaded position or first position and an unloaded position or second position as described above.

Figure 5:
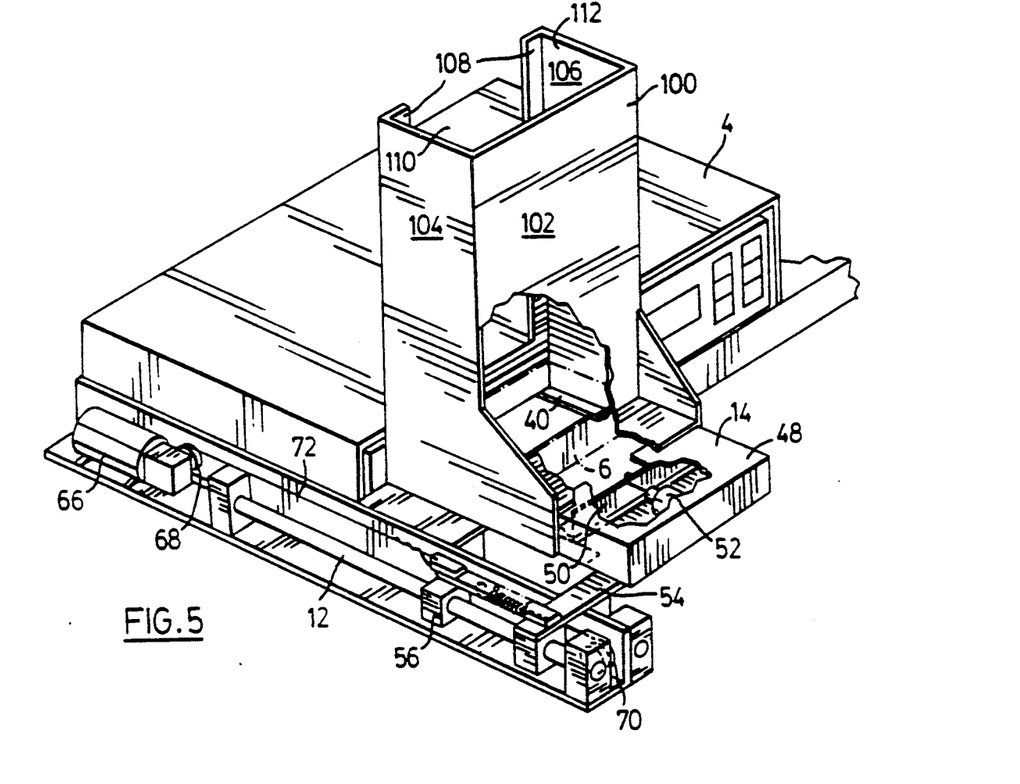
FIG. 5 is a prospective view of a second embodiment of the invention.

FIGS. 5 to 9 inclusive illustrate a second embodiment of the invention whereby the magazine 100 is adapted to be disposed in front of the video machine 4 as best illustrated in FIG. 5.

The second embodiment of the invention shown in FIG. 5 does not include a pusher but includes a gripper 14 which is similar in structure to that disclosed in the first embodiment.

The electrical motor 66 is disposed axially to shaft 12 in the second embodiment rather than being disposed perpendicular to same as shown in the first embodiment. The action of first pulley 68, second pulley 70, bushing 56, connection member 54 and wire 72 is similar to that discussed in the first embodiment of the invention. Magazine 100 also includes front wall 102, end walls 104 and 106 as well as side wall 108 which presents a side opening 110.

The magazine 100 also includes an opening 112 at the top thereof which is adapted to receive a stack of cassettes 6 to be retained therein. The bottom of magazine 100 includes lip means 40 which are adapted to retain the stack 32 of cassettes in a vertical position.

Figure 9:
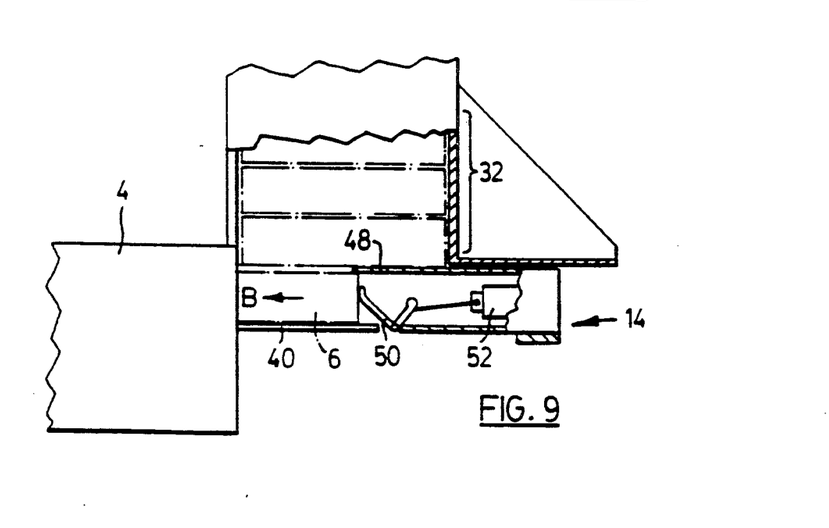
FIG. 9 is a partial side elevational view of the second embodiment of the invention.

FIG. 9 shows that the gripper 14 is adapted to advance in the direction of arrow B so as to insert the bottom cassette 6 into the recorder 4 in a manner similar to that described in the first embodiment.

Figure 6:
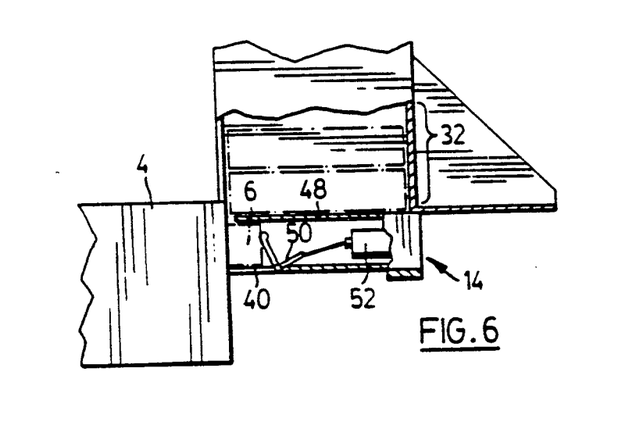
FIG. 6 is a partial side elevational view of a second embodiment of the invention in a loading position.

However, the second embodiment disclosed shows that the stationary arm 48 prevents the remaining stack of cassettes from dropping to lips 40 in the loaded position as best illustrated in FIG. 6.

Figure 7:
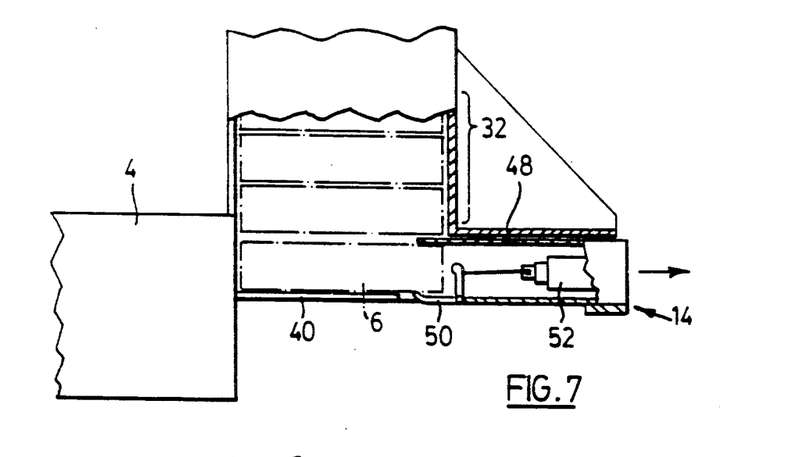
FIG. 7 is a partial cross-sectional view of a second embodiment of the invention showing the stationary and displaceable arm of the gripper.
Figure 8:
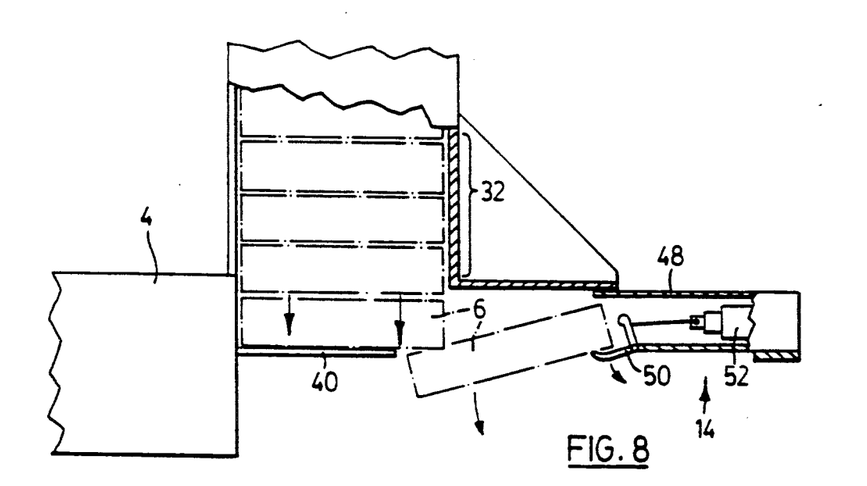
FIG. 8 is a partial side elevational view of a second embodiment of the invention in an unloaded position.

Once the cassette 6 has been ejected from recorder 4, solenoid 52 is activated so that the cassette 6 is gripped between stationary arm 48 and displaceable arm 50 so as to withdraw the cassette 6 from recorder 4 as best illustrated in FIGS. 7 and 8. Solenoid 52 is again de-energized so as to release cassette 6 from gripper 14 as shown in FIG. 8. Simultaneously the stack 32 of cassettes drops towards the lip 40 as best illustrated in FIG. 8.

Thereafter, solenoid 52 is again energized so as to displace displaceable arm 50 which is utilized to advance the bottom cassette 6 into machine 4 as best illustrated in FIG. 6. As the cassette is inserted into machine 4 from the unloaded position shown in FIG. 8 to the loaded position shown in FIG. 6 stationary arm 48 is adapted to prevent the remaining stack of cassettes from dropping to lip 40.

The cassette changer as described herein is relatively inexpensive to construct and it is simple to use as well as providing an efficient and durable means of automatically sequentially loading and unloading cassettes from a magazine into a video recorder sequentially in accordance with a programmable device which as been programmed as desired.

Although the preferred embodiments as well as the operation and use have been specifically described in relation to the drawings, it should be understood that variations in the preferred embodiments could be achieved by persons skilled in the trade without departing from the spirit of the invention. Accordingly the invention should not be understood to be limited to the exact form revealed by the drawings.

The embodiments of the invention in which an exclusive property or privilege is claimed is defined as follows:

1. A cassette changer for loading and unloading cassettes from a recorder comprising:

a. a magazine for holding a plurality of cassettes adjacent said recorder;
b. displaceable means for loading one cassette from said magazine into said recorder in a first position and for unloading said one cassette from said recorder to a second position;
c. a shaft;
d. said displaceable means mounted for slidable movement along said shaft between said first and second positions;
e. flexible means for moving said displaceable means between said first and second positions;
f. an electrical motor associated with said flexible means for moving said displaceable means between said first and second positions so as to sequentially load and unload said cassettes into and from said recorder respectively.

2. A cassette changer as claimed in claim 1 wherein said flexible means comprises a wire.

3. A cassette changer as claimed in claim 2 further including pulley means associated with said electrical motor for engagement with said wire, said wire connected to said displaceable means so as to move said displaceable means between said first and second positions when energized by said electrical motor means.

4. A cassette changer as claimed in claim 3 wherein said magazine is horizontally disposed.

5. A cassette changer as claimed in claim 3 wherein said magazine stacks said cassettes, and wherein said displaceable means loads the bottom cassette from the said stack into said recorder in said first position and unloads said cassette from said recorder to a second position.

6. A cassette changer as claimed in claimed in claim 5 wherein said displaceable means comprises:
a. a gripper for gripping said cassette from said recorder to unload said cassette from said recorder in said second position;
b. a pusher for pushing said bottom cassette from said magazine into a loading position as said gripper unloads said cassette from said recorder in said second position;
c. said gripper adapted to advance said bottom cassette into said recorder in said first position
and wherein said pusher and gripper are simultaneously displaced.

7. A cassette changer as claimed in claim 6 wherein said gripper and said pusher is mounted for simultaneous slidable movement along said shaft between said first and second positions.

8. A cassette changer as claimed in claim 7 wherein said magazine is adapted to be disposed on top of said recorder, said magazine including;
a. an opening at the top thereof for receiving said cassettes for stacking therein;
b. a tray disposed at the bottom thereof;
c. an opening at the side thereof for receiving said pusher to push said bottom cassette from said stack in said magazine to said tray when said gripper unloads said cassette from said recorder in said second position, said tray guiding said bottom cassette into said recorder as said gripper advances said bottom cassette into said recorder in said first position.

9. A cassette changer as claimed in claim 8 wherein said tray is disposed in front of said recorder.

10. A cassette changer as claimed in claim 5 wherein said displaceable comprises gripper for gripping said cassettes from said recorder for unloading said cassette from said recorder in said second position, and for advancing said bottom cassette from said stack into said recorder in said first position.

11. A cassette changer as claimed in claim 10 wherein said gripper is mounted for slidable movement along said shaft between aid first and second positions.

12. A cassette changer as claimed in claim 11 wherein said magazine is adapted to be disposed in front of said recorder, said magazine including:
a. an opening at the top thereof for receiving said cassettes for stacking therein;
b. a lip disposed at the bottom thereof for retaining said cassettes in said stacked position.

13. A cassette changer as claimed in claim 12 wherein said gripper advances said bottom cassette along said lip into said recorder in said first position.

14. A cassette changer as claimed in claim 13 wherein said gripper includes a stationary arm and a displaceable arm, said displaceable arm activated by solenoid so as to:
a. grip said cassette from said recorder between said displaceable and stationary arms to withdraw said cassette from said recorder to said second position wherein said stack of cassette drops to said lip;
b. advance said bottom cassette into said recorder by said displaceable arm in said first position while said stationary arm prevents said stack of cassettes from falling to said lip in said first position.

15. A video cassette changer for loading and unloading video cassettes from a video cassette machine comprising;
a. a magazine adapted to be disposed on top of said machine, said magazine including:
(i) an opening at the top thereof for receiving said cassettes for stacking therein;
(ii) a tray disposed at the bottom thereof;
(iii) a side opening;
b. a gripper for advancing said cassette in said tray into said recorder in a loaded position, and for unloading said cassette from said recorder in an unloaded position;
c. a pusher receivable by said side opening for pushing the bottom cassette from said stack in said magazine into said tray in said unloaded position and retractable from said side opening to permit said stack of cassettes to fall within said magazine in said loaded position;
d. a shaft;
e. said pusher and said gripper mounted for simultaneous slidable movement along said shaft between said loaded and unloaded position;
f. a wire for moving said pusher and said gripper;
g. pulley for receiving said wire;
h. an electrical motor associated with said pulley for activating said wire to move said pusher and said gripper to sequentially load and unload said cassettes into and from said machine respectively.

16. A video cassette changer as claimed in claim 15 including solenoid for activating said gripper.

17. A video cassette as claimed in claim 16 wherein said gripper includes a stationary arm and displaceable arm connected to said solenoid.

18. A video cassette changer as claimed in claim 17 wherein said wherein said tray includes a peripheral lip.

19. A video cassette changer for loading and unloading video cassettes from a video cassette machine comprising;

a. a magazine adapted to be disposed in front of said machine, said magazine including:
   (i) an opening at the top thereof for receiving said cassettes for stacking therein;
   (ii) a lip disposed at the bottom thereof for retaining said cassette in said stacked position in said magazine;
b. a gripper including a stationary arm and a displaceable arm;
c. solenoid associated with said displaceable arm so as to:
   (i) advance the bottom cassette into said magazine by said displaceable arm into said machine in a loaded position while said stationary arm prevents said stack of cassettes from falling to said lip in said loaded positions;
   (ii) grip said cassette from said recorder between said stationary and displaceable arm to withdraw said cassette from said machine to an unloaded position where said stationary arm clears said stack of cassettes in said magazine and where said stack of cassettes drops to said lip;
d. a shaft;
e. said gripper mounted for slidable movement along said shaft between said loaded and unloaded positions;
f. a wire for moving said gripper between said loaded and unloaded positions;
g. a pulley for receiving said wire;
h. an electrical motor associated with said pulley for activating said wire to move said gripper to sequentially load and unload said cassettes into and from said machine respectively.

20. A video cassette changer as claimed in claim 19 wherein said electrical motor is activated by programmable so as to sequentially load and unload said cassettes into said machine.

* * * * *